United States Patent [19]

Miyazaki et al.

[11] 4,062,027
[45] Dec. 6, 1977

[54] DATA EXPOSURE DEVICE FOR CAMERA

[75] Inventors: Kazuo Miyazaki, Kawasaki; Sachio Ohmori, Yokohama, both of Japan

[73] Assignee: Nippon Kogaku K.K., Tokyo, Japan

[21] Appl. No.: 563,955

[22] Filed: Apr. 1, 1975

[30] Foreign Application Priority Data

Apr. 9, 1974 Japan .............................. 49-39786[U]

[51] Int. Cl.² .............................................. G03D 15/02
[52] U.S. Cl. ...................... 354/127; 354/32;
354/33; 354/35; 354/60 F; 354/145
[58] Field of Search ....................... 354/32, 33, 34, 35,
354/60 F, 127, 139, 145, 149

[56] References Cited

U.S. PATENT DOCUMENTS

| 3,688,664 | 9/1972 | Mashimo ............................ 354/33 |
| 3,710,701 | 1/1973 | Takishima et al. .................... 354/145 |
| 3,714,872 | 2/1973 | Mashimo et al. ...................... 354/33 |
| 3,971,049 | 7/1976 | Ohmori et al. ........................ 354/145 |

*Primary Examiner*—Russell E. Adams

*Attorney, Agent, or Firm*—Fitzpatrick, Cella, Harper & Scinto

[57] ABSTRACT

An improved data exposure device for a camera is provided with a flash starting voltage detecting circuit for generating a signal indicating that the voltage across a flash capacitor rises a predetermined level sufficient to turn on a flash lamp to emit a suitable amount of light on exposure surface upon which data is recorded, a trigger circuit including a trigger capacitor for triggering said flash capacitor and a switching element actuatable for discharging said trigger capacitor, and a synchro circuit including a synchro switch closed when a shutter is released for actuating said switching element when said signal is generated while said synchro switch is closed. An improvement is that said synchro circuit is prevented from actuating said switching element when said synchro switch is closed under the condition that the voltage across said flash capacitor is less than a predetermined level sufficient to cause said flash lamp to start to flash.

5 Claims, 4 Drawing Figures

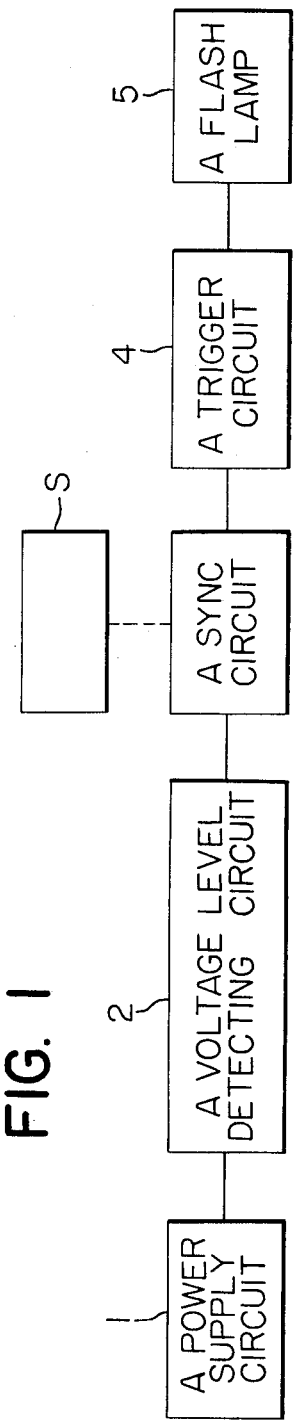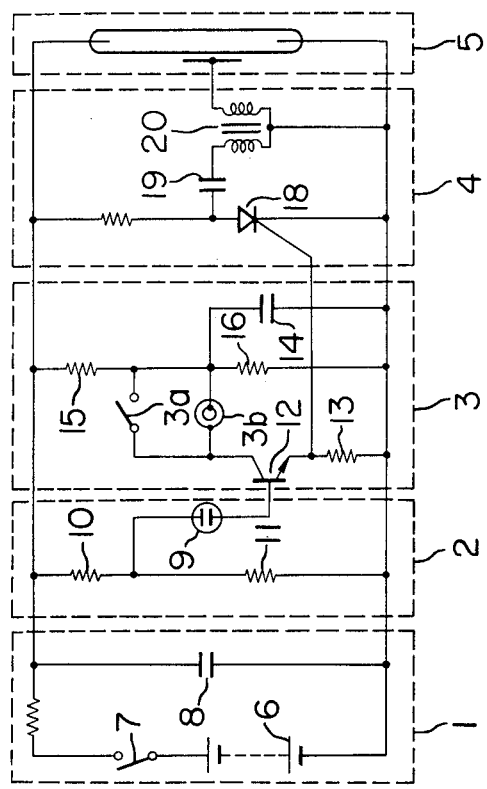

DATA EXPOSURE DEVICE FOR CAMERA

BACKGROUND OF THE INVENTION

1. Field of the Invention

The present invention relates to a device for a camera for exposing the desired exposure data such as a data when a photo is taken, by the flashing of a flash lamp which is started to flash in synchronism with the starting of external flash means for exposure of a subject, whereby said data may be also recorded upon film.

2. Description of the Prior Art

In the conventional data exposure devices of the type described, a pilot lamp is incorporated which is turned on when the voltage charged across a main flash capacitor rises to a predetermined level sufficient to start the flash lamp so that an operator may make an exposure after having confirmed that the pilot lamp is turned on. However when the data exposure device is used in cooperation with a motor-drive system, it is not always true that the voltage across the main flash capacitor for the flash lamp for exposure of the data has already reached a predetermined level for starting the flash lamp whenever the shutter is to be released. The faster the shutter release or exposure cycle, the less the amount of light emitted from the flash lamp becomes so that the data are underexposed for recordal compared with the subject.

In other words, the data exposures are made without the operator confirming that the pilot lamp is turned on.

SUMMARY OF THE INVENTION

Moreover in case of a camera with only one synchroterminal or socket, external flash means for exposure of a subject cannot be used when a data exposure device is used. One of the objects of the present invention is therefore to provide a data exposure device which may permit a camera even with only one synchroterminal to use external flash means so that the data may be exposed and recorded on the same film with a desired density relative to that of the subject.

In general, the polarities of the terminals of external flash means for exposure of a subject with respect to the polarities of a synchro-terminal or socket in a camera have not been yet standardized, and are different from one product to another. Another object of the present invention is therefore to provide a data exposure device which may be positively actuated regardless of the polarities of the terminals of external flash means connected to the synchro-terminal or socket in the camera.

The above and other objects, features and advantages of the present invention will become more apparent from the following description of preferred embodiments thereof taken in conjunction with the accompanying drawings.

BRIEF DESCRIPTION OF THE DRAWING

FIG. 1 is a block diagram of a data exposure device in accordance with the present invention; and FIGS. 2, 3 and 4 are circuit diagrams of first, second and third embodiments, respectively, of the present invention.

Same reference numerals are used to designate similar part throughout the figures.

DESCRIPTION OF THE PREFERRED EMBODIMENTS

Figure 3:
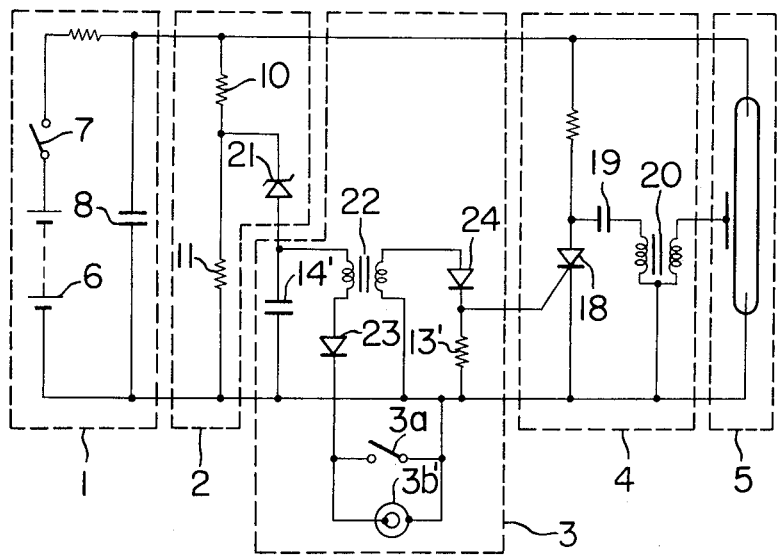

First referring to FIG. 1, the fundamental construction of a data exposure device in accordance with the present invention will be described prior to the detailed description of the preferred embodiments thereof. A power supply circuit 1 includes a main flash capacitor, and a voltage level detecting circuit 2 includes a voltage-level detecting element for detecting the rise to a predetermined level of the voltage across the main flash capacitor and generating the "ON" signal.

A synchro circuit 3 includes a synchro switch in a camera interlocked with a shutter release button, and a synchro terminal for connection with external flash means S which is supplied with the power from an external power supply source. A trigger circuit 4 includes a switching element actuable in response to the "ON" signal from the voltage-level detecting circuit 2. The data exposure device further includes a flash lamp 5 for exposure of data, and external flash means S is for the exposure of a subject.

When the voltage across the main flash capacitor reaches a predetermined level, it is detected by the voltage-level detecting circuit 2. That is, when the voltage-level detecting circuit 2 detects that the voltage across the main flash capacitor rises a predetermined level, it generates the "ON" signal in response to which the trigger circuit 4 is actuated. The "ON" signal is transmitted through the synchro switch in the synchro circuit 3 to the trigger circuit 4. The synchro switch is also provided to trigger the external flash means S connected to the synchro terminal. When the synchro switch is closed in response to the "ON" signal, the synchro circuit 3 is actuated to transmit the "ON" signal to the trigger circuit 4. In response to the "ON" signal the switching element is turned on to actuate the trigger circuit 4 so that the flash lamp 5 starts to flash. When external flash means S is connected to the synchro terminal, it also starts to flash concurrently. Even when the synchro switch is closed before the voltage detecting circuit 2 has detected the rise to a predetermined level of the voltage across the main flash capacitor, the "ON" signal has not yet been generated so that both of the synchro and trigger circuits 3 and 4 will not be actuated. Therefore the flash lamp 5 will not flash, but flash means S starts to flash. In other words, the flash lamp 5 starts to flash when and only when the synchro switch is closed in response to the "ON" signal (which is generated when the voltage across the main flash capacitor reaches a predetermined level.).

Next referring to FIG. 2, a first embodiment of the present invention will be described hereinafter. A power supply 6, a main switch 7, and a main flash capacitor 8 make up the power supply circuit 1 for a flash lamp 5. A neon glow lamp 9 makes up a voltage detecting element which generate the "ON" signal when the voltage across the main flash capacitor 8 rises above a predetermined level. The neon glow lamp 9 and resistors 10 and 11, which make up a voltage divider, make up the voltage detecting circuit 2.

The synchro circuit 3 comprises the synchro switch 3a, the synchro terminal 3b, a transistor 12, a bias resistor 13, a capacitor 14, and resistors 15 and 16, which make up a voltage divider. The base of the transistor 12 is connected to the neon glow lamp 9; the emitter, to the negative terminal of the power supply circuit 1 through the bias resistor 13; and the collector, to the junction between the synchro switch 3a and the synchro terminal 3b, which are connected in parallel.

The trigger circuit 4 comprises an SCR 18, a trigger capacitor 19, and a trigger transformer 20. The gate of SCR 18 is connected to the emitter of the transistor 12 in the synchro circuit 3.

Next the mode of operation will be described. When the main switch 7 is closed, the main flash capacitor 8 is charged through a resistor while the capacitors 14 and 19 are also charged. As the voltage across the main flash capacitor rises, the voltage divided by the voltage divider consisting of the resistors 10 and 11 and impressed to the neon glow lamp 9 (which may be a zener diode) also rises. When a voltage sufficient to start the flash lamp 5 is charged across the main flash capacitor 8, the voltage across the neon glow lamp 9 rises also to a predetermined level so that the current flows through the transistor 12 and its bias resistor 13. Thus the neon glow lamp 9 is turned on, it being also used as a pilot lamp. Thus the voltage-level detecting circuit 2 is actuated. When the synchro switch 3a is closed, the transistor 12 is turned on so that the capacitor 14 is immediately discharged through the bias resistor 13. Therefore the current flows into the gate of SCR 18 so that the latter is turned on. As a result, the trigger capacitor 19 is immediately discharged through the primary of the trigger transformer 20 so that a high voltage is induced across the secondary thereof. Therefore the energy stored on the main flash capacitor 8 is discharged through the flash lamp 5 to cause it to flash. The external flash means S for exposure of a subject also starts to flash when the synchro switch 3a is closed; that is, in synchronism with the flash lamp 5 for data exposure.

When the synchro terminal 3b is directly inter-connected between the voltage-level detecting circuit 2 and the trigger circuit 4, the high voltage is impressed to the synchro terminal 3b when the "ON" signal is generated. As a result, the synchro terminal 3b is turned into a sort of conduction or closed state so that the flash lamp 5 starts to flash even when the synchro switch 3a is not closed. To overcome this problem, the transistor 12 is inserted as means for preventing the operation of the external flash means S from adversely affecting the normal operation of the switching element 18 in the trigger circuit 4.

The capacitor 14 is inserted in order to increase the gate current of the SCR so as to ensure its positive conduction.

Next the second embodiment of the present invention will be described with reference to FIG. 3, in which reference numerals used in FIG. 2 are also used to designate similar parts. A diode 21 has a function similar to that of the neon glow lamp 9 in the first embodiment; that is, it is used as voltage level detecting means. A pulse transformer 22 is inserted instead of the transistor 12 in the first embodiment which exhibits the unsatisfactory temperature characteristic and breakdown voltage. Its primary is connected to the voltage-level detecting circuit 2, the synchro switch 3a and the synchro terminal 3b' while the secondary, to the gate of SCR 18 in the trigger circuit 4. Rectifier diodes 23 and 24 are inserted in the primary and secondary circuits, respectively.

Next the mode of operation of the second embodiment with the above construction will be described hereinafter. When the voltage sufficient to start the flash lamp 5 is charged across the main flash capacitor 8, the voltage across the diode 21 rises to a predetermined level. That is, the voltage level detecting circuit 2 is actuated. The capacitor 14' is also charged. When the synchro switch 3a is closed, the voltage across the capacitor 14' is immediately discharged through the primary of the pulse transformer 22, the rectifier diode 23 and the synchro switch 3a so that the current induced in the secondary flows through the rectifier 24 and the bias resistor 13' into the gate of SCR 18. Therefore SCR 18 is turned on. The mode of operation following the above step is substantially similar to that of the first embodiment already described.

According to the first and second embodiments of the present invention, the external flash means S is actuated even when a camera has only one synchro terminal, and the desired data may be exposed and recorded upon the film with a desired density. However, the positive and negative polarities of the terminals of external flash means S connected to those of the synchro terminal 3b or 3b' have not been yet standardized, and are different from one product to another. Therefore when the external flash means S is connected to the synchro terminal 3b with the polarities opposite to those in the second embodiment of the present invention, the flash lamp 5 will not flash at all even when the synchro switch 3a is closed. A third embodiment of the present invention was made to overcome this problem.

Figure 4:
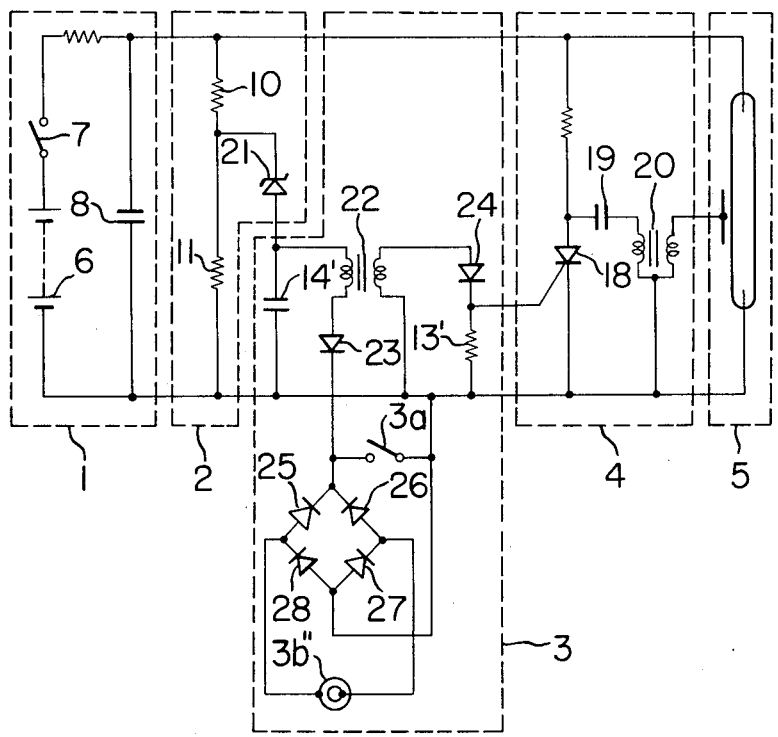

Third Embodiment, FIG. 4.

In FIG. 4, same reference numerals used in FIGS. 2 and 3 are also used to designate similar part. The third embodiment shown in FIG. 4 is substantially similar in construction to the second embodiment shown in FIG. 3 except that a diode bridge consisting of diodes 25, 26, 27 and 28 is inserted between the synchro switch 3a and the synchro terminal 3b' as a current flowing direction determination means. After the voltage across the main flash capacitor 8 has reached a predetermined level sufficient to cause the flash lamp 5 to start, the synchro switch 3a is closed so that SCR 18 is turned on and the flash lamp 5 starts to flash. The external flash means or stroboscope S connected to the synchro terminal 3b" also starts to flash when the synchro switch 3a is closed because the current flows from the synchro terminal 3b" through the diode 25, the synchro switch 3a and the diode 27 back to the synchro terminal 3b" or from the synchro terminal 3b" through the diode 26, the synchro switch 3a and the diode 28 back to the synchro terminal 3b" depending upon the polarities of the terminals of the external flash means or stroboscope S connected to the synchro terminal 3b".

As described above, according to the present invention, the exposure data may also be exposed by the flash lamp 5 which is started to flash in synchronism with the flashing of external flash means S and is recorded upon film with a desired density. The same is true even in case of the motor-driven successive exposures. According to the third embodiment, the flash lamp 5 may start to flash in synchronism with the starting of the external flash means or stroboscope S regardless of the polarities of the terminals thereof connected to the synchro terminal 3b".

We claim:

1. A data exposure device for a camera by which a desired data is exposed to a film by igniting a flash lamp, comprising:

a. a main flash capacitor for applying a charged voltage to the flash lamp;

b. a voltage detecting element which becomes conductive when the voltage across the main flash capacitor reaches a predetermined level sufficient to cause the flash lamp to generate a proper light quantity;

c. a synchro switch adapted to be closed when a shutter of the camera is released;

d. switch means connected to both the voltage detecting element and the synchro switch, the switch means generating an output due to closure of the synchro switch only when the voltage detecting element is conductive;

e. a trigger circuit actuated by said output, the flash lamp being triggered by actuation of the trigger circuit; and f. a synchro terminal connected in parallel with the synchro switch.

2. A data exposure device according to claim 1, wherein said switch means further includes a transistor whose collector is connected to a closed circuit formed by the synchro switch and the synchro terminal, whose emitter is connected to the trigger circuit and whose base is connected to the voltage detecting element.

3. A data exposure device according to claim 1, wherein said switch means further includes:

a. a pulse transformer with the primary connected between the voltage detecting element and the synchro switch and with the secondary connected to the trigger circuit; and b. a diode connected in the primary circuit of the pulse transformer.

4. A data exposure device according to claim 1, further comprising:

means for determining the direction of current flowing through the closed circuit formed by the synchro terminal and the synchro switch, whereby the exposure device can be operative regardless of the polarities of the terminals of external device having a different power source and connected to the synchro terminal.

5. A data exposure device according to claim 4, wherein the current flowing direction determining means is a diode bridge.

* * * * *